Figure 1:
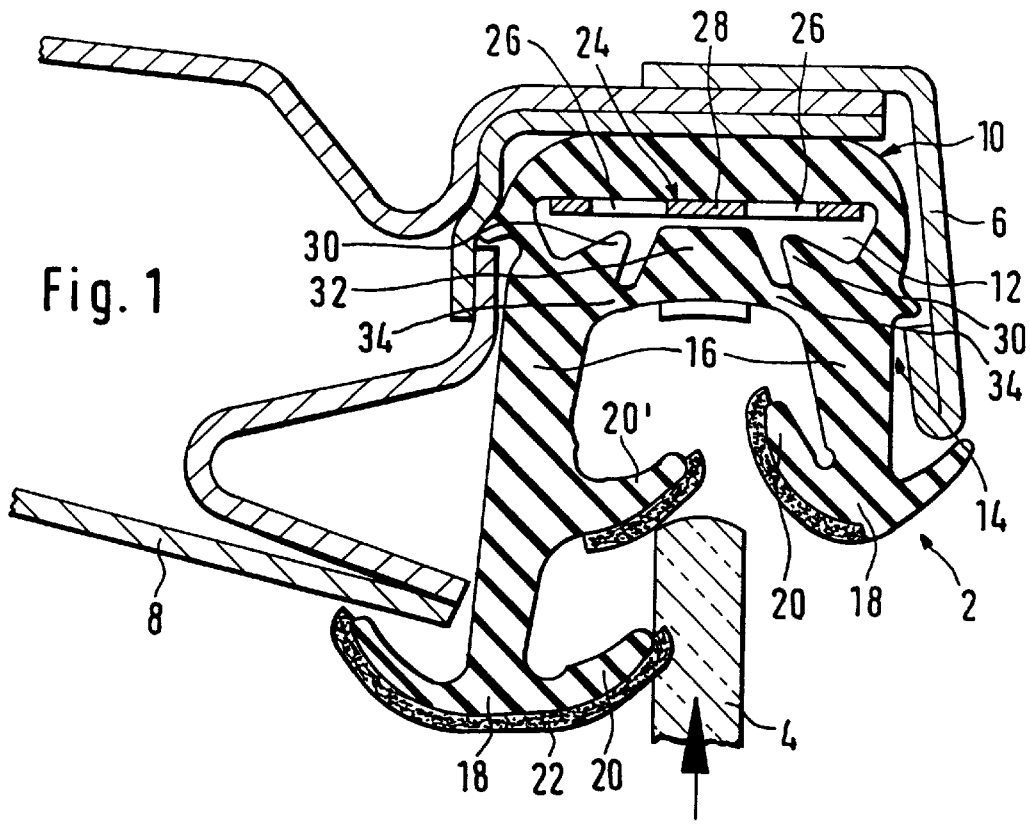

United States Patent [19]
Lehnen et al.

[11] Patent Number: 6,038,930
[45] Date of Patent: Mar. 21, 2000

[54] DEVICE FOR DETECTION OF TRAPPING IN A POWER-OPERATED CLOSING ELEMENT

[75] Inventors: Hans Gunter Lehnen, Wadern-Noswendel; Roland Lorig, Sinstelt; Stefan Schmitt, Trier, all of Germany

[73] Assignee: I.E.E. International Electronics & Engineering S.a.r.l., Luxembourg

[21] Appl. No.: 09/053,943

[22] Filed: Apr. 2, 1998

[51] Int. Cl.[7] .................................................. G01B 7/16
[52] U.S. Cl. ............................................................ 73/774
[58] Field of Search .................................. 73/865.8, 767, 73/774; 200/61.43, 61.61, 61.62, 61.71, 61.73–61.75; 49/26, 28

[56] References Cited

U.S. PATENT DOCUMENTS

| | | |
|---|---|---|
| 1,808,699 | 6/1931 | Watkins . |
| 1,927,651 | 9/1933 | Reid . |
| 1,934,816 | 11/1933 | Randall . |
| 1,978,325 | 10/1934 | Reid . |
| 2,892,657 | 6/1959 | Brand et al. . |
| 3,465,476 | 9/1969 | Rayner et al. ........................ 200/61.71 |
| 3,710,050 | 1/1973 | Richards . |
| 3,793,772 | 2/1974 | Kouth . |
| 4,115,952 | 9/1978 | French . |
| 4,273,974 | 6/1981 | Miller . |
| 4,532,388 | 7/1985 | Sackmann et al. . |
| 4,773,155 | 9/1988 | Buchien . |
| 4,920,241 | 4/1990 | Miller . |
| 5,016,394 | 5/1991 | Iida et al. . |
| 5,233,758 | 8/1993 | Bielis et al. . |
| 5,262,603 | 11/1993 | Miller . |
| 5,285,136 | 2/1994 | Duhame . |
| 5,296,658 | 3/1994 | Kramer et al. . |
| 5,384,982 | 1/1995 | Galperin . |
| 5,459,962 | 10/1995 | Bonne et al. . |
| 5,592,060 | 1/1997 | Racine et al. . |
| 5,602,370 | 2/1997 | Kau . |
| 5,621,290 | 4/1997 | Heller et al. . |

FOREIGN PATENT DOCUMENTS

| | | |
|---|---|---|
| 3347945 | 10/1984 | Germany . |
| 4201019 | 7/1993 | Germany . |
| 4427537 | 2/1996 | Germany . |
| 195 02 033 | 6/1996 | Germany . |
| 230234 | 3/1925 | United Kingdom . |
| 942892 | 11/1963 | United Kingdom . |
| 2300444 | 11/1996 | United Kingdom . |

Primary Examiner—Robert Raevis

[57] ABSTRACT

A device is proposed for detection of trapping in a power-operated closing element (4) with a switching element (24), which is arranged along a first closing edge, and at least two force transmitters (16) extending longitudinally, which flank the closing element (4) laterally in the closed position and transmit a trapping force to the switching element (24) in the case of trapping. The switching element (24) is designed as a foil-type element with two carrier foils (36), which are arranged above each other a specific distance apart. At least two contact elements to (40) are arranged on the carrier foils (36) in such a way that two longitudinal active areas (26) separated from each other by a longitudinal spacer (42) are formed, each active area (26) being arranged in the range of action of a force transmitter (16).

12 Claims, 2 Drawing Sheets

DEVICE FOR DETECTION OF TRAPPING IN A POWER-OPERATED CLOSING ELEMENT

The invention relates to a device for detection of trapping in a power-operated closing element. Devices of this type are used to switch off the drive unit of the closing element and if necessary reverse its movement in the event of trapping, e.g. of part of the body between two opposite closing edges. These anti-trapping devices are used, for example, on electrically operated window lifters and sliding roofs, automatic vehicle doors, e.g. in buses and trains, as well as in lift doors or the like.

LU-A-87 942 describes, for example, an anti-trapping device, in which a switching element, e.g. a foil pressure sensor, is mounted on the closing edge of the closing element. If an obstacle is in the path of movement of the closing element, the foil pressure sensor is tripped by direct application of pressure when the obstacle is struck and the drive control of the closing element reverses the direction of movement of the latter. This device is characterised by an extremely high response probability, but problems occur when the closing element is closed. In this device the closing element is sealed against a closing edge by abutment, i.e. the opposite areas of the switching element and closing edge are pressed against other to form the seal. Consequently the switching element is exposed to an inadmissible continuous load, which leads to its destruction after a short time.

DE-PS-195 02 033 describes an anti-trapping device for a closing element in a motor vehicle with an elastic U-shaped sealing section, the legs of which flank the closing element laterally when it is closed. In the event of trapping the reinforced legs of the sealing section conduct the trapping force to two longitudinal pairs of contact strips, which are arranged in a hollow chamber in the base of the sealing section in such a way that they each lie in the direct range of action of a leg. A longitudinal spacer in the area of the contact face of the window, which prevents accidental tripping of the protective device during closing of the window, so that continuous loading of the pairs of contact strips is avoided, is arranged in the hollow chamber between the two pairs of contact strips. The disadvantage of this device lies in the high production cost, because two pairs of contact strips and a spacer must be installed in the narrow hollow chamber of the sealing section and positioned in such a way that they are secured against displacement.

Consequently the task of the present invention is to propose a device for detection of trapping in a power-operated closing element, which prevents inadmissible loading of the switching element when the closing element is closed and is additionally characterised by low production costs.

According to the invention this problem is solved by a device for detection of trapping in a power-operated closing element with a switching element arranged along a first closing edge and with at least two force transmitters extending longitudinally, which flank the closing element laterally in the closed position and in the event of trapping transmit a trapping force to the switching element. The switching element is designed as a foil-type element with two carrier foils, which are preferably arranged one above the other a specific distance apart by means of lateral spacers, the spacers extending along the long sides of the carrier foils. At least two contact elements are arranged on the carrier foils in such a way that two active areas, which are separated from each other by a longitudinal spacer, are formed, each active area being arranged in the range of action of a force transmitter.

The proposed protective device is characterised by extremely low production costs, because during assembly the foil-type switching element can be positioned in one operation in relation to the force transmitter, e.g. by insertion in a narrow hollow chamber of a U-shaped hollow chamber section, the legs of the latter being designed as force transmitters. The positioning of the switching element in the hollow chamber can be advantageously facilitated by adapting the inside dimensions of the hollow chamber to the outside dimensions of the switching element.

The switching element is advantageously prefabricated before installation in the device, so that the individual contact elements and the spacer are a predetermined lateral distance from each other and need not be positioned and fixed separately. Consequently the individual contact elements and the spacer cannot be displaced in relation to each other, so that reliable functional behaviour of the device is ensured.

The fixed lateral distances of the individual components of the switching element in relation to each other predetermined by the prefabrication of the switching element before installation also permit, if required, particularly compact construction of the entire device. The possibility of accurate positioning of the active areas of the switching element in relation to the force transmitters and of the inner spacer in relation to the contact face of the closing element in fact permit reduction of their respective lateral dimensions to a functional minimum dimension. By contrast the individual contact bars and the spacer must have a larger lateral dimension in the current state of the art in order to compensate for inaccuracies in the positioning of the individual elements.

In a preferred embodiment a contact element is arranged on each of the two carrier foils in such a way that the two contact elements are opposite each other and are brought into contact when the two carrier foils are pressed together. The two carrier foils can be brought directly into contact with each other or via a layer of semiconductor material arranged between the two contact elements, the electrical resistance between the two contact elements diminishing when the two carrier foils are pressed together with increasing contact pressure. In the first case the switching element forms a simple 1/0 switch, whereas in the second case a foil pressure sensor is formed, which supplies an electrical signal corresponding to the amount of force exerted on the switching element.

In an alternative embodiment the contact elements are arranged on one of the two carrier foils, whereas the other carrier foil is coated with an electrically conductive material. The electrically conductive material may comprise, for example, a simple metal foil or a semiconductor material, the electrical resistance between the two contact elements diminishing when the two carrier foils are pressed together with increasing contact pressure. In this embodiment a simple 1/0 switch is again formed in the first case, whereas a foil pressure sensor, which supplies an electrical signal corresponding to the amount of force exerted on the switching element, is formed in the second case.

To ensure reliable tripping of the switching element, each contact element preferably has a longitudinal comb-type conductor structure, the respective conductor structures engaging in each other. When a pressure is exerted locally on the two carrier foils the contact fingers of the two contact elements lying in this local area are then brought into contact with each other and the switching element is tripped.

In an advantageous embodiment the two active areas are electrically insulated from each other, i.e. each of the active areas has two contact elements, the respective contact elements of the different active areas being electrically insulated from each other. In the case of trapping on one side it can be established with this device, by separate evaluation of the two active areas, from which side the trapping has taken place or on which side the greater trapping force occurs.

In an alternative embodiment an electrically conductive connection is made between the respective contact elements of the first active area and the respective contact elements of the second active area. In such a switching element a signal independent of the trapping side is generated. The advantage of such an embodiment lies in the number of connections required for the switching element. Whereas four connections are required in two active areas insulated from each other to connect the device to an electronic evaluator, only two connections have to be provided in the alternative embodiment, with the result that installation of a device of this type, e.g. in a motor vehicle, is greatly simplified.

In a first embodiment of this type each contact element comprises several contact fingers spaced in the longitudinal direction, which extend at right angles to the longitudinal direction of the switching element over the two active areas and are each connected electrically to one another by a longitudinal contact strip, the contact fingers of the two contact elements being arranged alternately in the longitudinal direction. The longitudinal contact strips can be arranged, for example, under the lateral spacers.

In an alternative embodiment two contact elements, which are connected with electrical conductivity at one end of the switching element to the corresponding contact element of the other active area, are arranged in each of the active areas. This design is particularly advantageous when a diode is used between the contact elements for a performance check, because the connections of the switching elements and the diode are arranged at the same end of the switching element. Consequently the switching element complete with the diode can be prefabricated, the end of the switching element opposite the connections (at which the contact elements of the two active areas are connected to each other) always having a minimum overall height and thus being easily insertable in the hollow chamber of a hollow section.

An embodiment of the invention will now be described below with reference to the enclosed figures.

Figure 2:
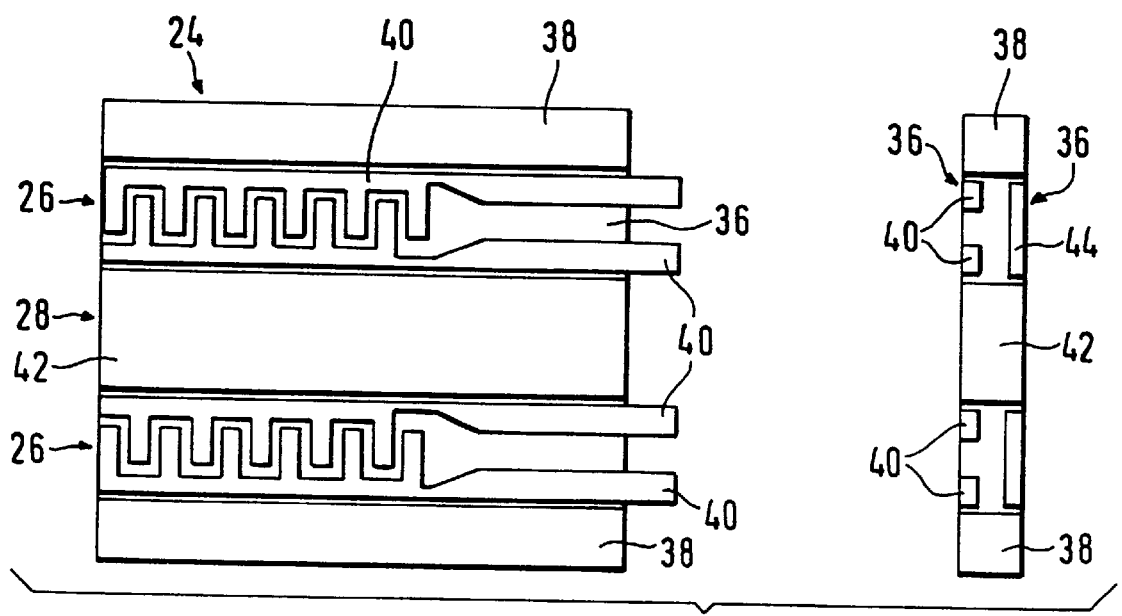
Figure 3:
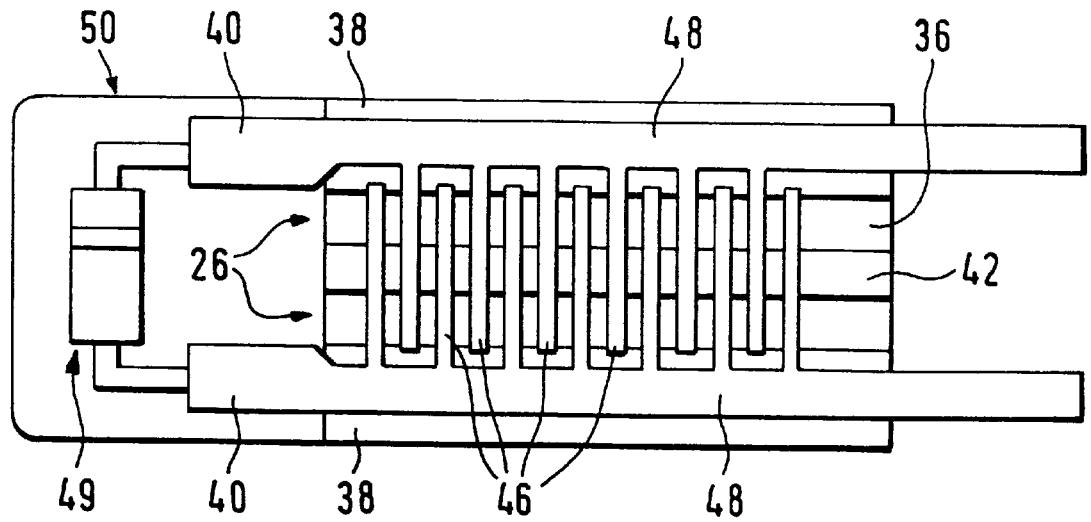
Figure 4:
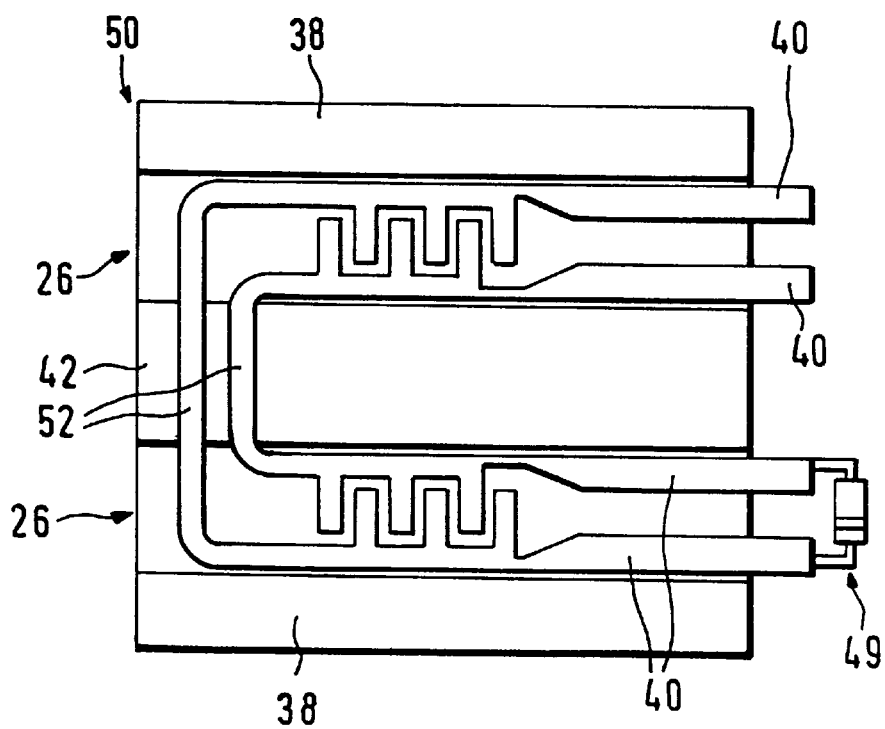

FIG. 1: shows a cross-section through a trapping detection device installed in a window guide section in an electrically actuated side window in a vehicle, FIG. 2: a first advantageous embodiment of a switching element for a trapping detection device, FIG. 3: a second advantageous embodiment of a switching element for a trapping detection device, FIG. 4: a third advantageous embodiment of a switching element for a trapping detection device.

The device for detection of trapping described in FIG. 1 is designed as a sealing section 2 for a side window 4 of a motor vehicle and arranged in a profiled window frame 6 in a vehicle door 8. The seal section 2 comprises essentially a hollow section 10 made from elastic material with a hollow chamber 12, which is protected in a recess 14 in the frame 6, and two legs 16 extending on both sides of the side window 4, which guide and seal the window 4 during closing. The free ends 18 of the two legs 16 also each have on the side facing the window 4, a flexible sealing lip 20, which is applied to the window 4 as a seal during closing of the latter. To avoid generation of noise when the side window 4 slides along, the sealing lips 20 are provided with a flock coating 22 on the side facing the window 4. It should be noted that the two legs 16 of the U-section can be designed symmetrically or have different lengths and refinements, as shown in FIG. 1, so as to adapt themselves to an asymmetrical window guide section 6. In the second case an additional sealing lip 20', which is arranged at the height of the sealing lip 20 of the shorter leg 16, can be provided on the longer leg.

The legs 16 of the U-shaped hollow section 10 are preferably designed as force transmitters, which transmit a trapping force to a foil-type switching element 24 arranged in the hollow chamber 12 of the hollow section 10 in the case of trapping of an object between the free ends 18 of the legs 16 and the front edge of the window 4. The switching element 24 generates an electrical signal, which is further processed by a connected electronic evaluator (not shown) for control of the drive motor of the window 4.

The switching element 24 preferably comprises two active areas 26, which are arranged in the immediate range of action of the legs 16 and are separated by an interposed inactive area 28. To ensure accurate tripping of the switching element 24 even in the case of small trapping forces, each leg 16 preferably has a switching cam 30 projecting into the hollow chamber 12, which exerts a local pressure on the active area 28 of the switching element 24 assigned to it to trip the latter.

Between the switching cams 30 of the legs 16 the hollow section 10 advantageously has a flat buffer zone 32, which comes to rest on the inactive area 28 of the switching element 24 when the window 4 runs against the section base. Consequently the window 4 can be pressed against the section base to form a seal without the switching element 24 being tripped. To ensure reliable tripping of the switching element 24 even with small trapping forces, the buffer zone 30 is preferably disconnected mechanically from the legs 16 by required bending areas 34.

The switching element 24 is of foil-type construction and is advantageously prefabricated before installation in the hollow section 10. A plan view and cross-section of the switching element 24 of this type are shown in FIG. 2. It comprises two carrier foils 36, which are preferably arranged one above the other a specific distance apart by means of lateral spacers 38. The spacers extend along the long sides of the carrier foils 36. Contact elements 40 are arranged on the carrier foils 36 in such a way that two active areas 26 separated from each other by an inactive area 28 are formed. A further spacer 42 is advantageously bonded between the carrier foils 36 in the inactive area 28 of the switching element 24, so that these are not pressed together and the active areas 26 are tripped when the window 4 runs against the section base.

In the embodiment of the switching element 24 shown in FIG. 2 the contact elements 40 are mounted on one of the two carrier foils 36, whereas the other carrier foil 36 is coated with an electrically conductive material 44. The two contact elements 40 are designed as comb-type conductor structures, the respective conductor structures engaging in each other. If the two carrier foils 36 are pressed together in the active area 26, the two contact elements 40 arranged in this active area 26 contact each other and the switching element 24 is tripped.

The electrically conductive material 44 may, for example, comprise a simple metal foil or a semiconductor material, the electrical resistance between the two contact elements diminishing when the two carrier foils 36 are pressed together with increasing contact pressure. In the first case a simple 1/0 switch is formed by the switching element 24, whereas in the second case a foil pressure sensor, which supplies an electrical signal corresponding to the amount of force exerted on the switching element, is formed. Foil pressure sensors of this type are known, for example, by the name "force sensing resistors".

It should be noted that in an alternative embodiment a contact element 40 can be arranged on each of the two carrier foils 36 in such a way that the two contact elements 40 are opposite each other and are brought into contact when the two carrier foils 36 are pressed together. The two carrier foils can be brought into contact with each other directly or via a layer of semiconductor material arranged between the two contact elements, the electrical resistance between the two contact elements diminishing when the two carrier foils 36 are pressed together with increasing contact pressure. The switching element 24 again forms a simple 1/0 switch in the first case, whereas a foil pressure sensor, which supplies an electrical signal corresponding to the amount of force exerted on the switching element 24, is formed in the second case.

The switching element 24 shown in FIG. 2 has in each active area 26 two contact elements 40, which are electrically insulated from the contact elements 40 of the other active area 26, i.e. the two active areas 26 are electrically insulated from each other. In the case of trapping on one side it can be established with this device by separate evaluation of the two active areas 26 from which side the trapping has taken place or on which side the greater trapping force occurs. In this embodiment, however, four connections are required to connect the switching element 24 to the electronic evaluator.

By contrast, the two active areas are connected to each other with electrical conductivity in the embodiments of switching element 24 shown in FIGS. 3 and 4, with the result that the number of required connections is reduced to two. In a switching element of this type a signal independent of the respective trapping side is generated.

In FIG. 3 each contact element 40 comprises for this purpose several contact fingers 46 spaced out in the longitudinal direction and extending at right angles over the two active areas 26, which are connected electrically to each other by a longitudinal contact strip 48. The contact fingers 46 of the two contact elements 40 are arranged alternately in the longitudinal direction, so that at least two contact fingers 46 of the two contact elements 40 are brought into contact with each other when the two carrier foils 36 are pressed together. It should be noted that the individual transverse contact fingers 46 likewise extend over the inactive area 28 of the switching element 24. As the contact fingers 46 in this area are covered by the middle spacer 42, however, the switching element 24 cannot be tripped in this case. Furthermore, the longitudinal contact strips 48 can be arranged under the lateral spacer 38, which permits particularly compact construction of the switching element 24.

To check the switching element 24 a diode 49 is arranged between the two contact strips 48 in the switching element 24 shown in FIG. 3, the diode 49 being arranged at the end 50 of the switching element 24 opposite the connections. With the aid of a test voltage with reversible polarity applied to the connections the integrity of the switching element 24 can be checked with this diode 49. If the diode 49 is connected conductively, for example, the total resistance of the contact strips 48 can be measured and analysed for possible faults. In the case of a blocked diode the total resistance between the two contact elements 40 when the switching element 24 is not under load can be measured. These checks can be carried out automatically by the connected electronic evaluator, for example, so that faults in the switching element 24 can be detected in good time and indicated to the driver by a tell-tale light.

FIG. 4 shows a further embodiment of a switching element 24 with interconnected active areas 26. Two contact elements 40, which are each connected to the corresponding contact element 40 of the other active area 26 with electrical conductivity by conductors 52 at one end 50 of the switching element 24, are arranged in each of the active areas 26. This embodiment is particularly advantageous when a diode 49 is used between the contact elements for a performance check, because the connections of the switching element 24 and the diode 49 are arranged at the same end of the switching element 24. Consequently the switching element can be prefabricated complete with the diode 49, whereby the end 50 of the switching element 24 opposite the connections always has a minimum overall height and can thus be inserted easily in the hollow chamber 12 of the hollow section 10.

What is claimed is:

1. A device for detection of trapping in a power-operated closing element comprising:
   a. a foil-type switching element, which is arranged along a first closing edge, and
   b. at least two force transmitters extending longitudinally, said force transmitters flanking the closing element laterally, when said closing element is in a closed position, and transmitting a trapping force to said switching element in the case of trapping, wherein said foil-type switching element comprises a first and second carrier foil, a longitudinal spacer and at least two contact elements, said first and second carrier foils being arranged above each other at a specific distance, and said at least two contact elements being arranged on said first and second carrier foils in such a way that two longitudinal active areas are formed which are separated from each other by said longitudinal spacer, each active area being arranged respectively in the range of action of one of said force transmitters.

2. The device according to claim 1, wherein one of said contact elements is arranged on each of said first and second carrier foils in such a way that the two contact elements are opposite each other and are brought into contact when said first and second carrier foils are pressed together.

3. The device according to claim 1, wherein the two contact elements are arranged on the first carrier foil and wherein the second carrier foil is coated with an electrically conductive material.

4. The device according to claim 3 wherein each of the contact elements has a comb-type conductor structure, the respective conductor structures engaging each other.

5. The device according to claim 3 wherein the respective contact elements of a first of said two active areas are electrically connected to contact elements of a second of said two active areas.

6. The device according to claim 5, wherein two contact elements are arranged in each of the active areas, each of said contact elements being electrically connected at one end of the switching element to the respective contact element of the other active area.

7. The device according to claim 3 wherein each contact element comprises several contact fingers spaced out in the longitudinal direction, said contact fingers extending at right angles to the longitudinal direction of the switching element over the two active areas and being electrically connected to each other by a longitudinal contact strip, wherein the contact fingers of the two contact elements are arranged alternately in the longitudinal direction.

8. The device according to claim 3, wherein the electrically conductive material comprises a semiconductor material, the electrical resistance between the two contact elements diminishing when said first and second carrier foils are pressed together with increasing contact pressure.

9. The device according to claim 8 wherein the contact elements are applied on the respective carrier foil by a screen printing process.

10. The device according to claim 8 wherein the carrier foils are bonded together by means of lateral spacers, the spacers extending along the long sides of the carrier foils.

11. The device according to claim 8, wherein the two active areas are electrically insulated from each other.

12. A device for detection of trapping in a power-operated closing element comprising: foil-type switching element, which is arranged along a first closing edge, and least two force transmitters extending longitudinally, said force transmitters flanking the closing element laterally, when said closing element is in a closed position, and transmitting a trapping force to said switching element in the case of trapping, wherein said foil-type switching element comprises a first and second carrier foil, a longitudinal spacer and at least two contact elements, said first and second carrier foils being arranged above each other at a specific distance, and said at least two contact elements being arranged on said first and second carrier foils in such a way that two longitudinal active areas are formed which are separated from each other by said longitudinal spacer, each active area being arranged respectively in the range of action of one of said force transmitters; wherein one of said contact elements is arranged on each of said first and second carrier foils in such a way that the two contact elements are opposite each other and are brought into contact when said first and second carrier foils are pressed together.

* * * * *